United States Patent [19]

Kawamoto

[11] Patent Number: 5,005,172

[45] Date of Patent: Apr. 2, 1991

[54] DIAGNOSTIC SYSTEM IN A DATA PROCESSING SYSTEM

[75] Inventor: Masakazu Kawamoto, Komae, Japan

[73] Assignee: Fujitsu Limited, Kawasaki, Japan

[21] Appl. No.: 323,941

[22] Filed: Mar. 15, 1989

[30] Foreign Application Priority Data

Mar. 18, 1988 [JP] Japan .................................. 63-064941

[51] Int. Cl.⁵ .............................................. G06F 11/00
[52] U.S. Cl. ...................................... 371/18; 371/16.1; 364/200
[58] Field of Search ..................... 371/16.1, 18, 29.5; 364/200 MS File, 900 MS File

[56] References Cited

U.S. PATENT DOCUMENTS

| | | |
|---|---|---|
| 4,604,746 | 8/1986 | Blum ...................................... 371/18 |
| 4,606,024 | 8/1986 | Glass et al. ........................... 371/16.1 |
| 4,729,124 | 3/1988 | Hansel et al. ......................... 371/18 |

Primary Examiner—Charles E. Atkinson
Attorney, Agent, or Firm—Staas & Halsey

[57] ABSTRACT

A diagnostic system for diagnosing a number of connected modules within a data processing system. The diagnostic system uses one module as a management module to diagnose other function modules. A function module can be designated to recognize only diagnostic data by storing a diagnostic command within that module. By recognizing only nondiagnostic data, the other function modules can continue normal operation without interruption by the diagnosis.

7 Claims, 9 Drawing Sheets

DIAGNOSTIC SYSTEM IN A DATA PROCESSING SYSTEM

BACKGROUND OF THE INVENTION

1. Field of the Invention

The present invention relates to a diagnostic system in a data processing system. The data processing system is constituted by a management module and a plurality of function modules each connected to the management module through a common bus. The management module diagnoses one of the function modules through the common bus.

2. Description of the Related Art

Recent data processing systems employ a "distributed processing system" constituted by a plurality of function modules each including a microprocessor and connected to each other through a common bus line in order to increase the functions thereof. In the data processing system having such a module configuration, it is possible to easily realize desired functions by adding or deleting function modules to or from the system in accordance with various requirements of an user. When diagnosing, one of function modules is used as the management module and the others are used as function modules. When a fault occurs in the system, it is necessary to efficiently diagnose the function module, and in particular, the common bus line or bus interfaces.

SUMMARY OF THE INVENTION

The object of the present invention is to provide a diagnostic system enabling efficient diagnosis when a fault occurs in one of the function modules, particularly, a common bus line or bus interfaces.

In accordance with the present invention, there is provided a diagnostic system in a data processing system constituted by a management module and a plurality of function modules connected to the management module through a common bus line, the diagnostic system including: a service line connected to the management module and the plurality of function modules for sending a diagnostic mode command; a diagnostic line connected to the management module and the plurality of function modules for indicating a transfer of diagnostic data on the common bus line; a diagnostic mode storage unit provided in each of the function modules and operatively connected to the service line for setting the diagnostic mode; and a comparison unit provided in each of the function modules and operatively connected to the diagnostic mode storage unit and the diagnostic line for comparing a content of the diagnostic mode storage unit with the diagnostic line, wherein the comparison unit compares each module address, and a resultant data of the comparison is used as a condition for a module selection in the diagnosis so that a transfer of diagnostic data in the diagnostic mode is separated from the transfer of the data in a normal mode.

Further, a service bus line connected to the management module and the plurality of function modules is provided instead of the service line for sending a diagnostic mode command, and the management module manages the function module through the service bus line.

DESCRIPTION OF THE PREFERRED EMBODIMENTS

Before describing the preferred embodiments, an explanation will be given of a conventional diagnostic system.

Figure 1:
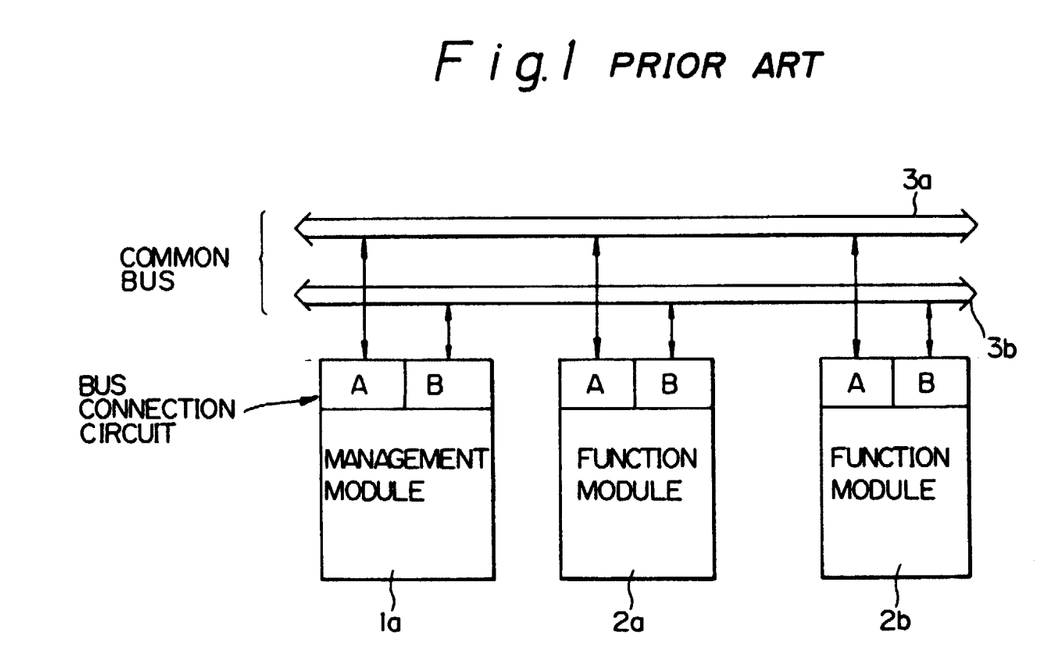
FIG. 1 is a schematic block diagram of one example of a conventional diagnostic system.

FIG. 1 is a schematic block diagram of one example of a conventional diagnostic system. In FIG. 1, 1a denotes a management module, 2a and 2b function modules, and A and B bus connection circuits provided in each module. Further, 3a and 3b denote a pair of common bus lines, and each module is connected to the common bus line 3a and 3b through the bus connection circuits A and B. The management module 1a is connected to each of function modules 2a and 2b through the common bus line 3a and 3b. Two methods, i.e., a dual-bus method and a diagnostic-bus method, can be used for diagnosing the function module in this type of diagnostic system.

In the dual-bus method, a pair of bus connection circuits A and B is provided between each of modules 1a to 2b and common buses 3a, 3b, each having the same function. The data is transferred through the one common bus 3a, and when a fault occurs in the common bus line 3a or the bus connection circuit A, the bus line is switched to the other common bus line 3b and the data transfer is continued through this bus line 3b. In this case, the management module 1a can diagnose the function module utilizing the common bus line 3a which is in a fault condition, and can continue the normal data transfer while diagnosing.

In the diagnostic-bus method, the common bus line 3b is only used for diagnosis. When a fault occurs, the management module 1a obtains the diagnostic information from the function modules 2a and 2b using the diagnostic-bus line 3b so that the management module 1a can diagnose the function module.

Figure 2:
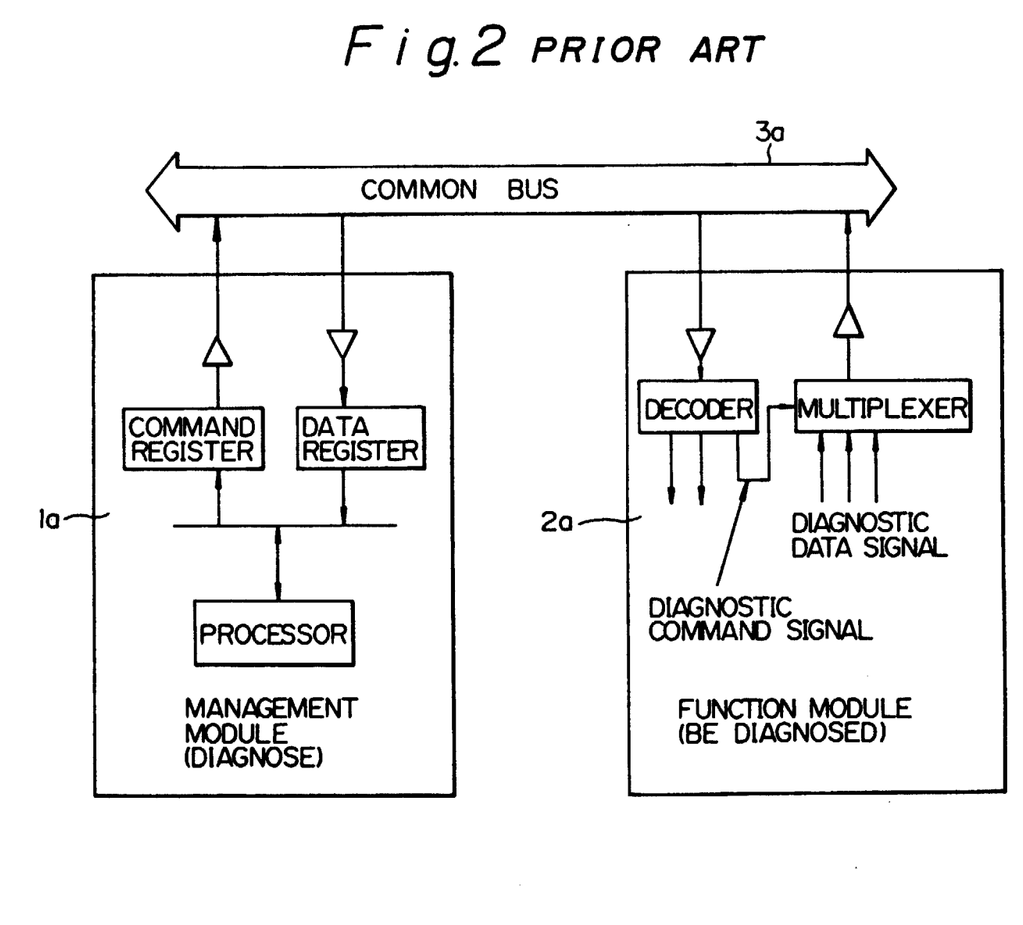
FIG. 2 is a schematic block diagram of another example of a conventional diagnostic system.

FIG. 2 is a schematic block diagram of another example of a conventional diagnostic system. In this structure, only one common bus line 3a is provided in the system. One method called a diagnostic command method, can be provided for diagnosing the function module in this structure of the diagnostic system. A command register in the management module 1a generates a diagnostic command signal to a decoder in the function module 2a to be diagnosed, the decoder decodes and generates the diagnostic command signal to a multiplexer, and the multiplexer returns the data diagosed in the function module to a data register in the management module through the common bus line 3a. These steps are carried out by a microprocessor in the management module 1a.

There are some problems, however, in these three methods shown in FIGS. 1 and 2, as explained hereinafter.

In the dual-bus method, it is possible to diagnose the common bus line 3a and the bus connection circuit A as well as the function module. However, it is necessary to provide two sets of common bus lines and the bus connection circuits each having the same function, and only half of the functions are utilized in the normal state, making this method inefficient.

In the diagnostic-bus method, it is possible to diagnose only the function module, and not the common bus line 3a and the bus connection circuit A.

In the diagnostic command method, the operation of another function module is interfered with by the fault since the common bus line and the bus connection circuit experiencing the fault are utilized as they stand. Accordingly, it is necessary to stop the normal operation of the system to prevent interference when diagnosing the function module.

A diagnostic system according to the present invention is explained in detail hereinafter.

Figure 3:
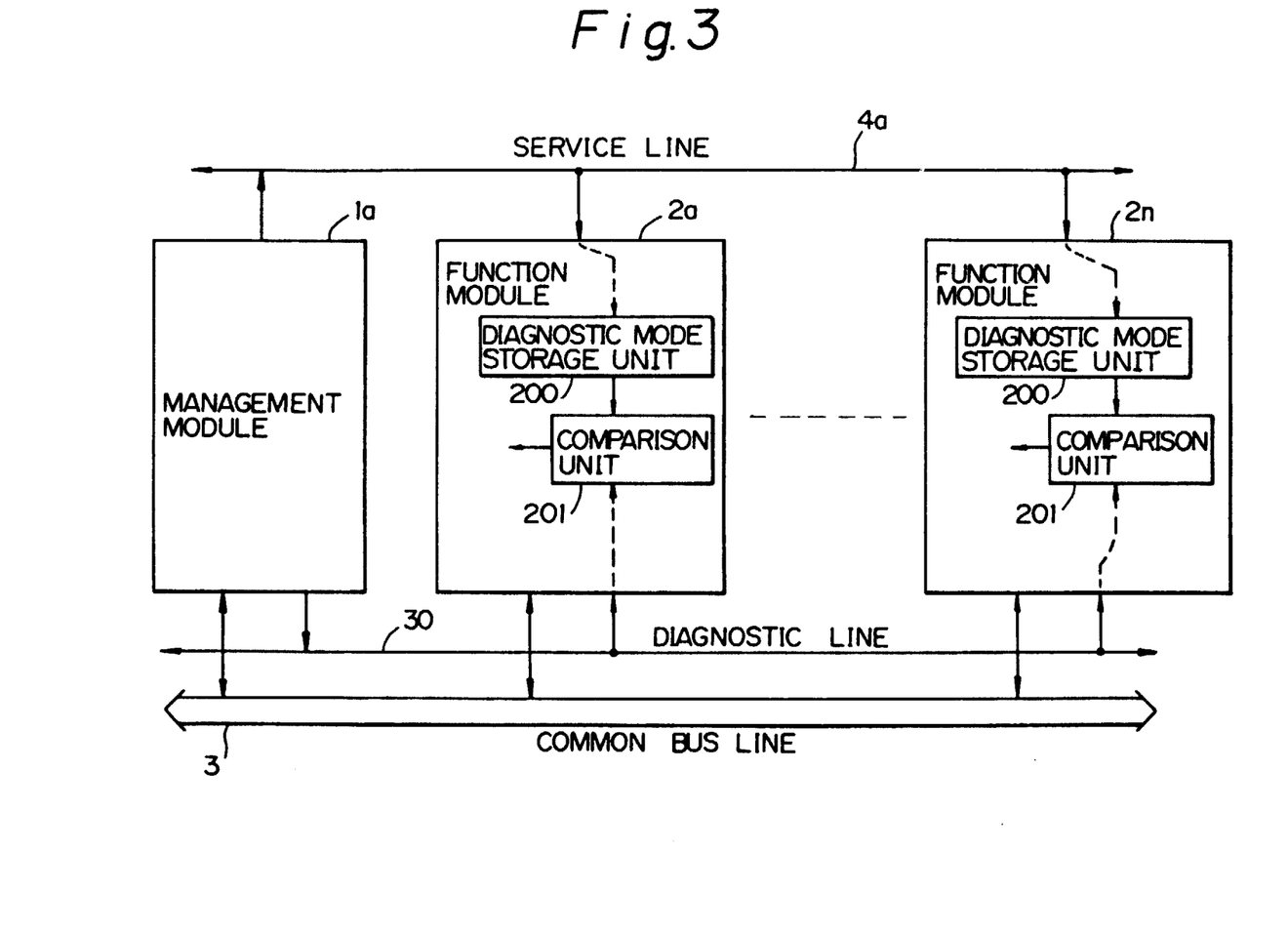
FIG. 3 is a basic structure of a diagnostic system according to the present invention.

FIG. 3 shows a basic structure of a diagnostic system according to the present invention. In FIG. 3, 1a denotes a management module, and 2a to 2n function modules. 4a denotes a service line, 30 a diagnostic line, and 3 a common bus line. The service line 4a is used for sending a diagnostic mode command to the function module. The diagnostic line 30 is used for indicating the transfer of the diagnosed data on the common bus 3. Each of function modules 2a to 2n comprises a diagnostic mode storage unit 200 for temporarily setting the diagnostic mode command through the service line 4a, and a comparison unit 201 for comparing a content of the diagnostic mode storage unit 200 with a signal on the diagnostic line 30. The resultant data of the comparison unit 201 is used as a condition for selection of the module by the comparison of an address when the diagnosis is performed, and the data transfer in the diagnosis is separated from the data transfer in the normal mode. The service line 4a can further be modified to a bus structure (service bus line 4b shown in FIG. 4) so that the management module can manage the diagnosis of the function modules 2a to 2n.

In the present invention, the service line 4a or the service bus line 4b is connected to the management module 1a and function modules 2a to 2n in addition to the common bus line 3. The management module 1a can directly control the operation of the function modules 2a to 2n and can switch the function module between the normal mode and the diagnostic mode. Further, the diagnostic line 30 is provided for indicating the diagnosis along with the common bus line 3.

In the diagnostic mode of the function modules 2a to 2n, when the diagnostic line 30 indicates the diagnostic mode (i.e., when transferring the diagnostic data), the function modules 2a to 2n respond the transfer of the diagnostic data on the common bus line 3. When the diagnostic line 30 does not indicate the diagnostic mode (i.e., when transferring normal data), the function modules 2a to 2n do not respond to the transfer of the diagnostic data on the common bus line 3.

In the normal mode of the function modules 2a to 2n, when the diagnostic line 30 indicates the diagnostic mode, the function modules 2a to 2n do not respond to the transfer of the normal data. When the diagnostic line 30 does not indicate the diagnostic mode, the function modules 2a to 2n respond to the transfer of the normal data.

As explained above, the management module can transfer diagnostic data to only the function module experiencing a fault without interfering with the normal operation of other function modules so that it is possible to easily diagnose the function module, the common bus line and the bus connection circuit. Accordingly, it is not necessary to provide two sets of common bus lines and bus connection circuits as shown in FIG. 1.

Figure 4:
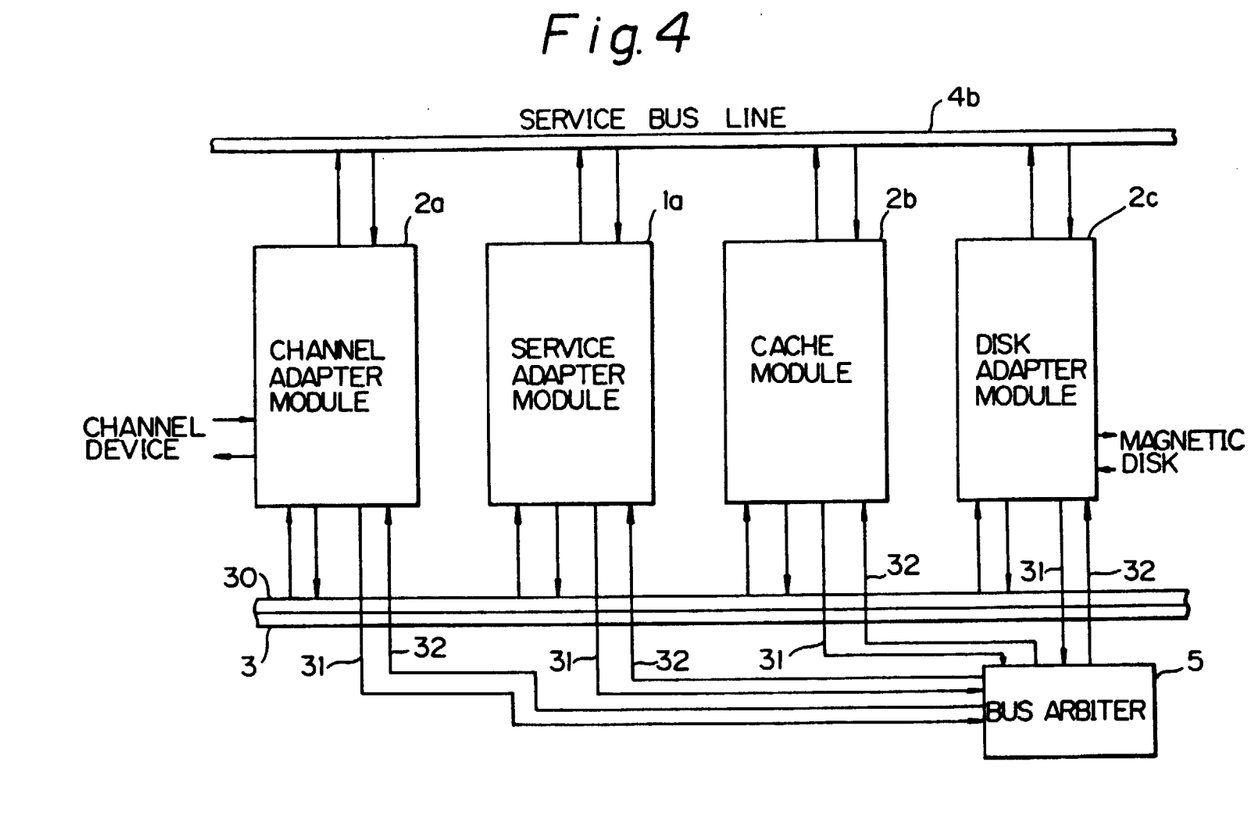
FIG. 4 is a schematic block diagram of a data processing system including a diagnostic system according to the present invention.

FIG. 4 is a schematic block diagram of a data processing system including a diagnostic system according to the present invention. In FIG. 4, the data processing system is connected to a host computer system through a channel device and also connected to a magnetic disk device as subsystem. 1a denotes a service adapter module operating as the management module. The service adapter module 1a loads a program to another function module, displays status on a maintenance panel, performs a maintenance service, for example, logging data, and diagnoses the function module. 2a denotes a channel adapter module, 2b a cache module, and 2c a disk adapter module. These function as function modules.

The channel adapter module 2a corresponds the data with the channel device. The cache module 2b comprises cache memory (not shown) and a cache control unit (not shown), and performs the cache operation. The disk adapter module 2c transfers the data to and from the magnetic disc device.

Figure 7:
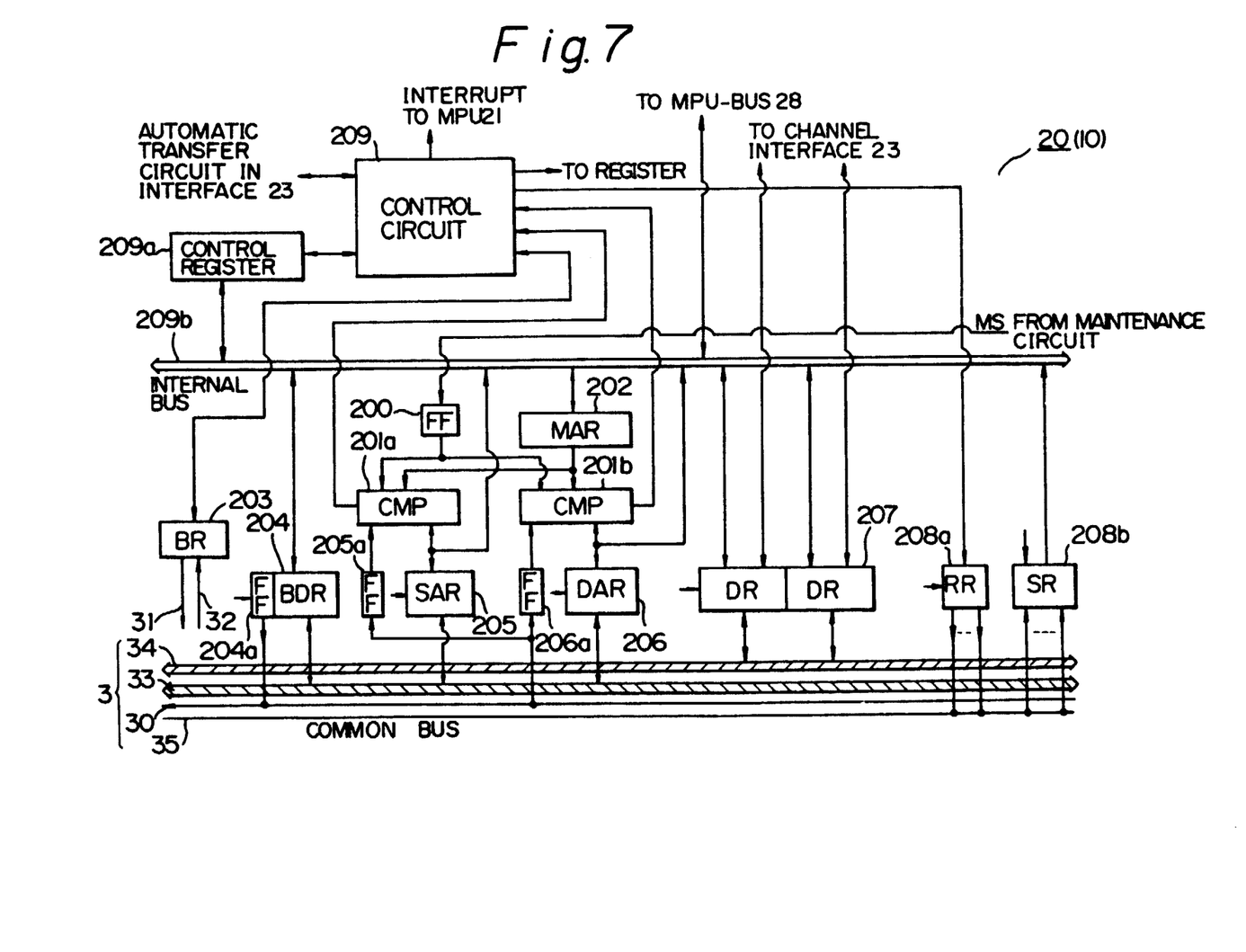
FIG. 7 is a detail block diagram of a bus interface circuit shown in FIG. 6.

The common bus line 3 comprises a control line 33, a data line 34, a response line 35 (these are shown in FIG. 7), a bus request line 31, and a bus grant line 32. A diagnostic line 30 is also added to the common bus line 3. The control line 33 is constituted by sixteen signal lines and two parity bits, and is used for a bus defining function (bus descriptor) for defining the module address for the transmission/reception and the characteristics of the transfer data. The data line 34 is constituted by eight signal lines and one parity bit, and is used for data transfer. The response line 35 is used for the transmission/reception of various signals, for example, a normal signal, a fault signal, a busy signal (BUSY), an acknowledge signal (ACK) and a not-acknowledge signal (NACK). The bus request line 31 is used for transferring a request signal for access to the bus. The bus grant line 32 is used for transferring a grant signal for access to the bus.

Figure 8:
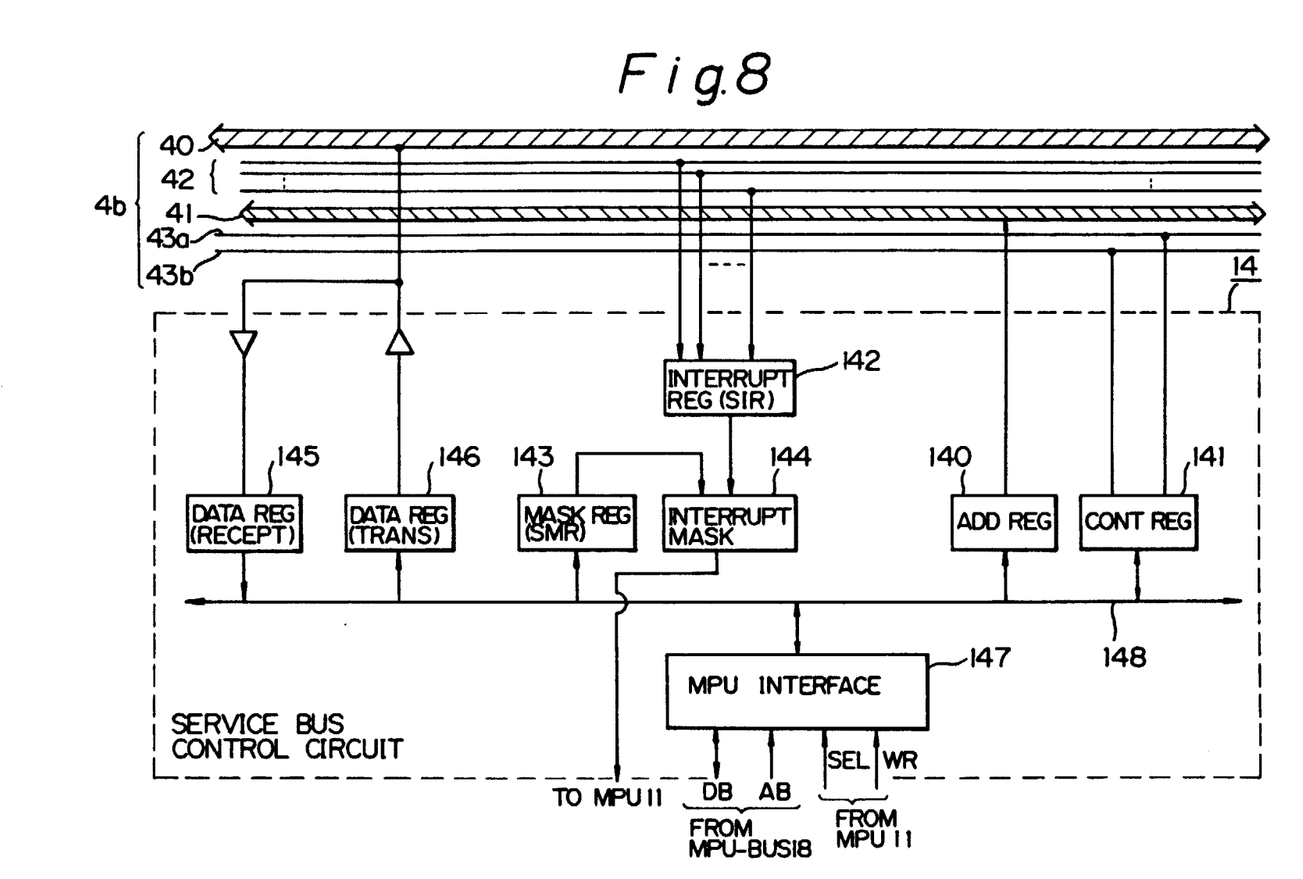
FIG. 8 is a detail block diagram of a service bus control circuit shown in FIG. 6.

The service bus line 4b comprises, as shown in FIG. 8, a control line 41, an address line 44, a data line 40, and response lines 43a and 43b. The control line 41 is used for controlling the read/write, and the interruption/selection of each module. The address line is constituted by sixteen signal lines and two parity bits, and is used for selecting the module and the register. The data line is constituted by eight signal lines for reading to or writing from the designated register. The response lines 43a and 43b are used for transferring the acknowledge signal ACK and the not-acknowledge signal NACK.

The reference numbers 5 denotes a bus arbiter connected to the modules 1a, and 2a to 2c through the bus request line 31, and the bus grant line 32. The bus arbiter 5 generates the bus grant signal to the bus grant line 32 in response to the bus request signals from the bus request line 31 after selecting the bus request signal having a higher priority in accordance with a predetermined priority order. The bus arbiter 5 applies a bus-enabling right signal to the selected module based on a time-sharing method.

Figure 5:
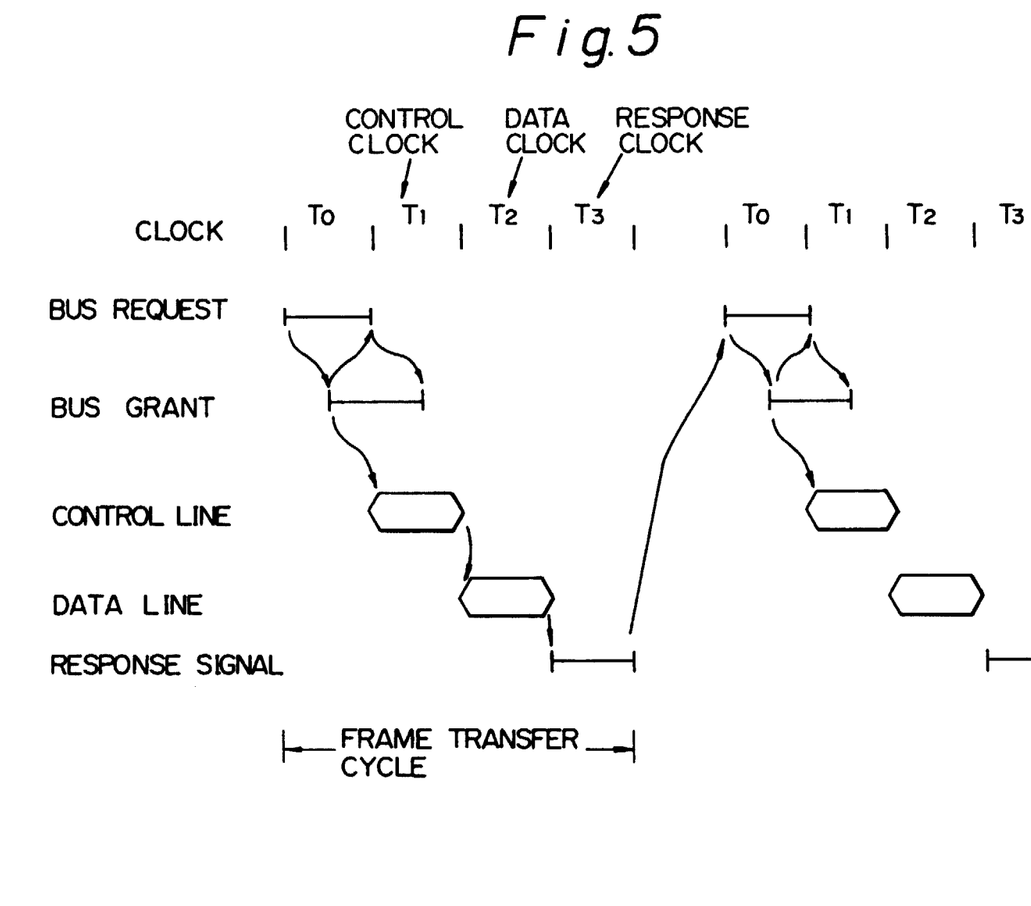
FIG. 5 is a timing chart for explaining the operation of the common bus.

FIG. 5 is a timing chart for explaining the operation of the common bus. CLK is a reference clock signal for synchronously controlling the whole system. The module receiving the bus grant signal sends a bus description (descriptor) indicating the characteristics of the transfer data, a source address for indicating an address of the transmission module, and a destination address for indicating an address of the reception module in response to a next clock T1 (this clock is called a control clock). The module designated by the source and destination addresses transfers and receives the data (containing the command) in response to a next clock T2 (this clock is called a data clock) through the data line 34. When the module normally receives the bus request signal, the source address, and the destination address in the above cycle, the module transfers and receives a normal response signal in response to a next clock T3 (this is called a response clock) through the response line 35. One cycle of the data transfer is completed in this cycle and the clocks T0 to T3 are referred to as a one frame transfer cycle.

Figure 6:
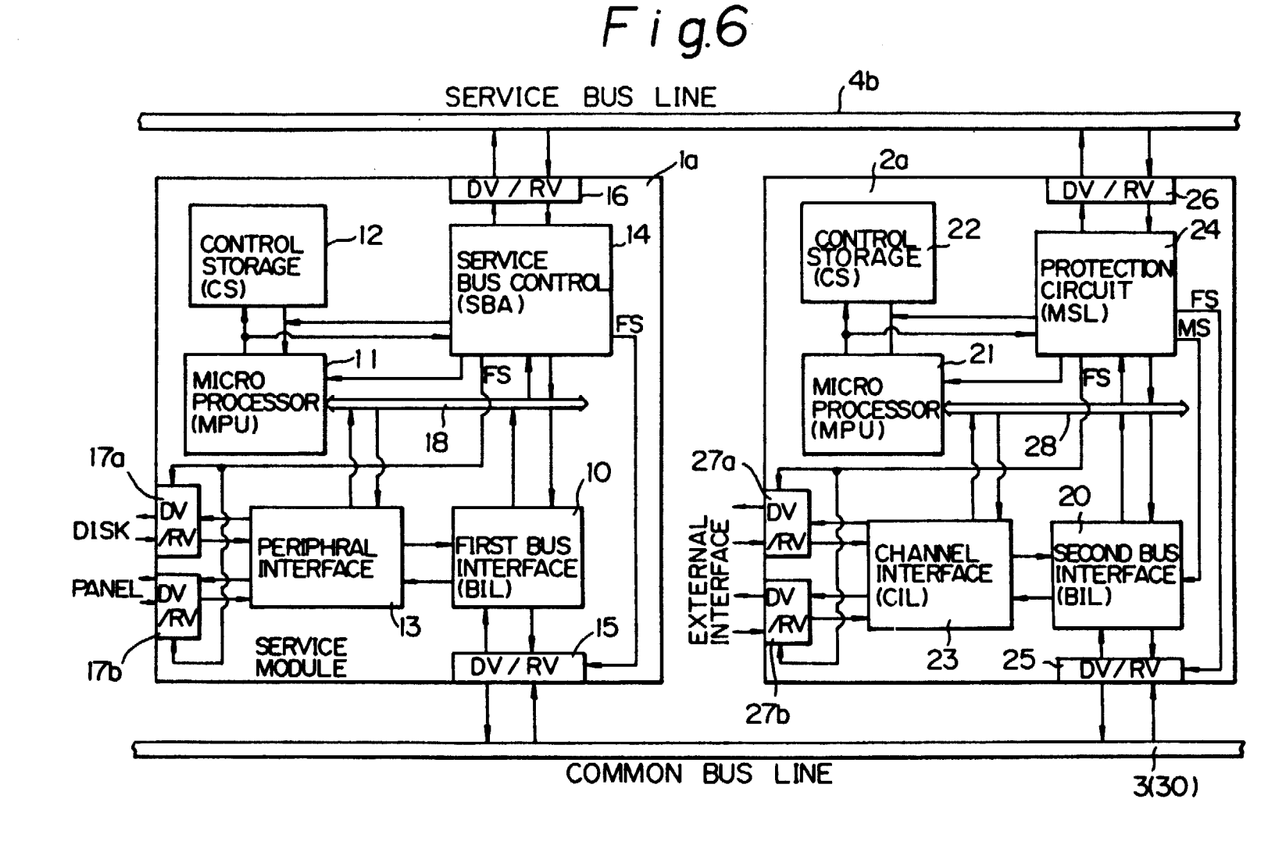
FIG. 6 is a schematic block diagram of a management module/ and a function module according to an embodiment of the present invention.

FIG. 6 is a schematic block diagram of a management module and a function module according to an embodiment of the present invention. In FIG. 6, the service adapter module 1a is the management module, and the channel adapter module 2a is the function module. 10 denotes a first bus interface circuit (BIL) for transferring the address, the data and the response signal by the common bus line 3 through a driver/receiver (DV/RV) 15. This circuit is shown in detail in FIG. 7. 11 denotes a microprocessor (MPU) for running various functions of the service adapter module 1a based on a program control. 12 denotes a control storage (CS) for storing a microprogram to operate the microprocessor 11.

The reference number 13 denotes an interface circuit for peripheral devices for corresponding with an internal magnetic disk in the peripheral device and an operation panel. 14 denotes a service bus control circuit (SBA) for transferring to and receiving from the service bus 4b through a driver/receiver (DV/RV) 16. This circuit is shown in detail in FIG. 8. 17a and 17b are also driver/receivers (DV/RV).

The reference number 18 denotes an MPU bus having an address bus and a data bus. The microprocessor 11 transfers the data between the bus interface 10, the peripheral interface 13 and the register of the service bus control circuit 14 through the MPU bus 18.

In the channel adapter module 2a, 20 denotes a second bus interface circuit (BIL) having the diagnostic mode storage unit 200 and the comparison unit 201, and for transferring the address, the data and the response signal by the common bus line 3. This circuit is shown in detail in FIG. 7. 21 denotes a microprocessor for running various functions of the channel adapter module 2a based on microprogram control. 22 denotes a control storage (CS) for storing the microprogram to operate the microprocessor 21.

The reference number 23 denotes a channel interface circuit (CIL) having an automatic data transfer function (ADT), and for performing the interface control or the channel device. 24 denotes a maintenance circuit. The maintenance circuit 24 reads data from or writes data to the control storage 22, stops the operation of the microprocessor 21, inhibits the driver/receiver based on a fence signal (FS), and generates a diagnostic mode signal (MS). This circuit is shown in detail in FIG. 9. Reference numbers 25, 26, 27a and 27b denote driver/receivers (DV/RV). 28 denotes an MPU bus. The microprocessor 21 transfers the data between the bus interface circuit 20, the channel interface circuit 23, and the register of the maintenance circuit 24.

If the disk module 2c is incorporated, the channel interface circuit 23 is replaced by a disk interface circuit.

If the cache module 2b is incorporated, the channel interface circuit 23 is replaced by a cache memory, and the driver/receivers (DV/RV) 27a and 27b are deleted.

FIG. 7 is a detail block diagram of a bus interface circuit (BIL) shown in FIG. 6. In FIG. 7, the control line 33, the data line 34, and the response signal line 35 are contained in the common bus line 3, and the diagnostic signal line 30 is added to the common bus line 3 as explained above.

The diagnostic mode storage unit 200 is constituted by a flip-flop circuit (FF). The flip-flop circuit 200 temporarily sets the diagnostic mode signal (flag) MS transferred from the maintenance circuit 24. The comparison units (CMP) 201a and 201b compare a module address and a diagnostic mode storage unit 200 with a diagnostic frame signal and a source/destination address, and output a coincidence/not-coincidence signal. 202 denotes a module address register (MLA) for setting a self module address. 203 denotes a bus register (BR) for outputting the bus request signal to the bus request line 31 and for receiving the bus grant signal from the bus grant line 32.

The reference number 204 denotes a bus description register (BDR) for storing the bus description indicating the characteristics of the transfer data (transfer frame). The bus description register 204 includes a flip-flop (FF) 204a for storing the transmission diagnostic frame bit and for outputting a diagnostic frame bit indicating that the transfer frame is a diagnostic frame.

The reference number 205 denotes a source address register (SAR) for setting the source address from an internal bus 209b or the control line 33 of the common bus line 3. 205a and 206a denote a flip-flop circuits (FF) for storing the reception diagnostic frame. These flip-flops receive the diagnostic frame bit from the diagnostic signal line 30 and output this frame bit to the comparison units 201a and 201b.

The reference number 206 denotes a destination register (DAR) for setting the destination address from the internal bus 209b and the control line 33 207 denotes a data register (DR) for holding the data transferred and received on the data line 34.

The reference number 208a denotes a response register (RR) for outputting the response signal ACK or NACK on the response signal line 35. 208b denotes a sense register (SR) for receiving a busy signal from the response signal line 35.

The reference number 209 denotes a control circuit. The control circuit 209 receives an address coincidence signal from the comparison units 201a and 201b, turns ON/OFF the gate of the data register 207, sends the response command to the response register 208a, turns ON/OFF the gate of the sense register 208b, commands the output of the bus request signal to the bus register 203, receives a notice of the reception of the bus grant signal from the bus register 203, generates an interrupt signal and sends it to the microprocessor 21, and corresponds the data request/response signal with an automatic transfer circuit of the channel interface circuit 23.

The reference number 209a denotes a control register or setting an operation mode command through the MPU bus 28 of the microprocessor 21, and sends the operation mode command, for example, the operation of the bus availability, the response, and the transfer to the control circuit 209.

The reference number 209b denotes an internal bus. The microprocessor 21 transfers the data containing the command between the bus descriptor 204 (204a), the source address register 205, the destination address register 206, the data register 207, the sense register 208b, and the control register 209a.

The bus interface circuit 10 in the service adapter module 1a shown in FIG. 6 has the same structure as the bus interface circuit 20. Accordingly, in the bus interface circuit 20, the common bus 3 is connected to the bus register 203 to occupy the bus, the bus description register 204 for transferring/receiving the bus description, the source/destination address registers 205 and 206 for transferring/receiving the source and destination address, the data register 207 for transferring-/receiving the data, the response register 208a for transferring the response signal, and the sense register 208b for receiving the response signal.

The module address register 202, the diagnostic mode flip-flop 200, the comparators 201a and 201b, the reception diagnosis frame flip-flop 205a and 206a, and the source/destination address register 205 and 206 are provided for detecting and selecting the module.

FIG. 8 is a detailed block diagram of a service bus control circuit 14 shown in FIG. 6. In FIG. 8, the service bus line 4b is constituted by the data signal line 40, the control signal line 41, the interrupt line 42 provided for each of modules 2a to 2n, the response signal line 43a and 43b for transferring/receiving the response signals ACK, NACK, WRITE, and SELECT, and the address line 44 for selecting the module.

The reference number 140 denotes an address register (ADD REG) for transferring the module address to be diagnosed. 141 denotes a control register (CONT REG) for transferring/receiving the response signals (as a control signal) ACK, NACK, WRITE, and SELECT to the response signal lines 43a and 43b.

The reference number 142 denotes an interrupt register (SIR) for setting an interrupt signal from each module through the interrupt line 42. 143 denotes a mask register (SMR) for setting a bit indicating the reception/not-reception of the interrupt. 144 denotes an interrupt mask circuit for masking the interrupt from the interrupt register 142 in accordance with the content of the mask register 143, and performs the interrupt of the microprocessor 11. 145 denotes a reception data register (DATA REG RECEPT) for receiving the data from the data signal line 40, and 146 a transmission data register (DATA REG TRANS) for transferring the data to the data signal line 40.

The reference number 147 denotes an MPU interface circuit for receiving a register selecting/writing signal (SEL, WR), receiving an address from the address bus (AB) of the microprocessor bus (MPU bus) 18, and transferring the data to the data bus (DB) of the MPU bus 18. 148 denotes an internal bus for transferring the data between the MPU interface 147, the transmission/-reception registers 145 and 146, the mask register 143, the address register 140, and the control register 141.

Figure 9:
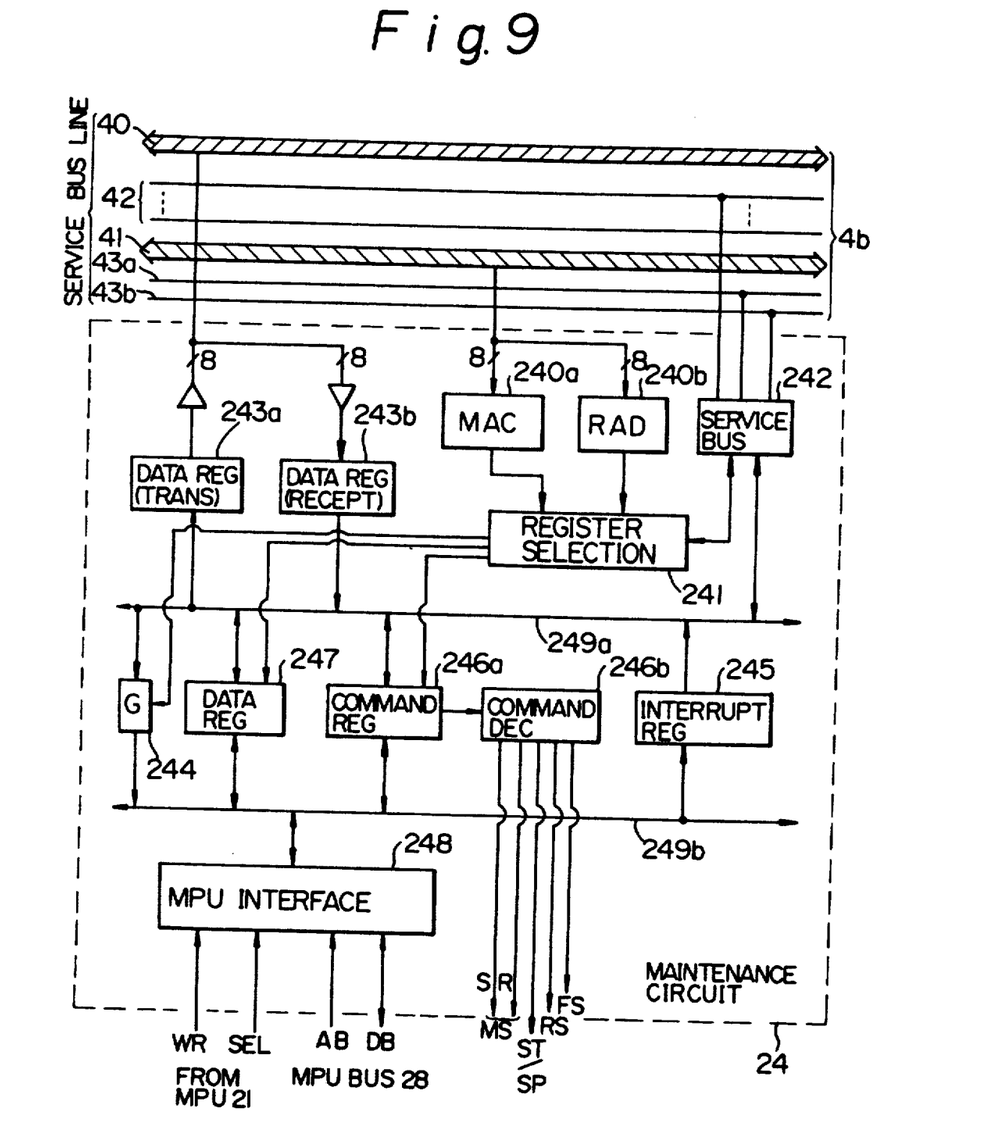
FIG. 9 is a detail block diagram of a protection circuit shown in FIG. 6.

FIG. 9 is a detail block diagram of a protection circuit shown in FIG. 6. In FIG. 9, 240a denotes a module address coincidence circuit (MAC) for comparing the module address from the control signal line 41 with its own module address and generating a selection signal when they coincide. 240b denotes a register address decoder (RAD) for decoding a register address from the control signal line 41 and generating a decoded output.

The reference number 241 denotes a register selection circuit for operating in response to the selection signal from the coincidence circuit 240a and generating a register selection signal. 242 denotes a service bus communication circuit for transferring the interrupt signal and transferring/receiving the control signals ACK, NACK, WRITE/READ, and SELECT. 243a denotes a transmission data register (DATA REG TRANS) for holding the transmission data. 243b denotes a reception data register for holding the reception data.

The reference number 244 denotes a gate for passing the control signal in response to an output of the register selection circuit 241. 245 denotes an interrupt register for holding the command of the interrupt to the service bus communication circuit 242. 246a denotes a command register for holding the transmission or reception command in response to the output of the register selection circuit 241. 246b denotes a command decoder. The command decoder 246b decodes the reception command of the command register 246a, and generates a set/reset signal MS in the diagnostic mode, a fence signal FS for cutting off the driver/receiver DV/RV, a start/stop signal ST/SP for the microprocessor 21, and a reset signal RS for the module.

The reference number 247 denote a data register (DATA REG) for holding the transmission or reception data in response to the output of the register selection circuit 241. 248 denotes an MPU interface circuit for receiving a write command (WR) and a register select signal (SEL) from the microprocessor 21, receiving an address from the MPU bus 28 through the address bus (AB), and performing the transmission/reception of the data from the MPU bus 28 through the data bus (DB).

The reference numbers 249a and 294b denote an internal bus. The internal bus 249a is used for interconnection among transmission/reception data registers 243a and 243b, a service bus communication circuit 242, a gate 244, a data register 247, a command register 246a and an interrupt register 245. The internal bus 249b connects the MPU interface circuit 248 to the gate 244, a data register 247, a command register 246a and an interrupt register 245.

The maintenance circuit 24 always receives an address sent on the service bus 4. When its own module is addressed, the module receives (in the write state) from or transfers (in the read state) to the data of the signal line 40 in accordance with the write/read signal when the select signal is set.

When the command register 246a is selected and certain data is set, the output of the command register 246a is decoded by the command decoder 246b and one of the external control signals MS, ST/SP, RS and FS is activated.

The operation of the diagnostic system according to the present invention is explained in detail hereinafter.

The diagnosis is started from the detection of an error in one of the modules 2a to 2c, or a diagnosis command from the operator panel. For example, when the address detection section (for example, comparator) of the bus interface circuit 20 in the module 2a experiences a fault in that the module responds not only to its own module address but also to other module addresses, thus the module takes in data meant to be transferred to other modules as well as data intended for its self. This results in a "double selection failure".

In order to avoid this failure, the module 2a detects that the data transfer number is different from the predetermined one, and indicates the relevant error of the common bus line 3 to the service adapter module 1a through the common bus line 3. The operator handling the operator panel then sends a command to diagnosis the specific module to the microprocessor 11 of the module 1a.

(1) In the service module 1a, the address and the command register selection address of the module (2a) to be diagnosed are set in the address register 140.

The diagnostic mode command is set in the data register 146, and the signals WRITE and SELECT are set in the control register 141. After these steps, the module address and register address are transferred to the control signal line 41 of the service bus 4, the diagnostic mode command to the data signal line 40, and the WRITE and SELECT signals to the response signal lines 43a and 43b.

(2) In the module to be diagnosed, the module address coincidence circuit 240a detects the coincidence of the module address, and the register address decoder 240b detects the command register selection.

The register selection circuit 241 selects the command register 246a, the reception data (diagnostic mode command) of the reception data register 243b is taken into the command register 246a through the internal bus 249a, and the response signal ACK is returned by the response signal lines 43a and 43b through the service bus communication circuit 242. The command decoder 246a decodes the diagnostic mode command of the command register 246a, outputs the diagnostic mode flag set signal MS, and transfers it to the bus interface circuit 20. The bus interface circuit 20 sets the diagnostic mode flip-flop 200 and establishes the diagnostic mode. After the above steps, only the diagnostic data indicated by the diagnostic frame bit can be received.

(3) Next, the service adapter module 1a detects the reception of the response signal ACK from the module 2a through the service bus 4, and transfers the diagnostic data. From this reason, the diagnostic frame with an added diagnostic bit is set in the bus description register 204 and 204a of the bus interface circuit 10. Further, the module address to be diagnosed is set in the destination register 206 of the bus interface circuit 10. After these steps, the diagnostic frame signal and the module address to be diagnosed are transferred to the control signal line 33 of the common bus line 3, and the diagnostic bit is transferred to the diagnostic line 30.

(4) The module to be diagnosed having the bus interface circuit 20 in the diagnostic mode responds to the diagnostic frame since the coincidence of the address is detected based on this frame in the comparator circuit 201b. Further, the module of the normal mode does not respond to the diagnostic frame since the coincidence of the address is not detected in the comparator circuit.

Conversely, the module to be diagnosed in the diagnostic mode does not respond to the normal frame not having the diagnostic frame since the coincidence of the address is not detected in the comparator.

In the case of double address selection, the normal response signal ACK is applied from the module 2a to be diagnosed through the common bus line 3 based on the transfer of the module address to be diagnosed.

The service adapter module 1a transfers the address of another module and the diagnostic frame signal having the diagnostic bit. The responses are not returned from any modules to the service adapter module 1a in the normal state. However, in the case of a fault, since the module 2a to be diagnosed responds, the service module 1a can detect the error of the module 2a.

Similarly, the service module 1a transfers the diagnostic frame, for example, the data having the erroneous parity bits, to the other module, and investigates the response from other module so that it is possible to detect the fault of the response in the bus interface circuit 20.

As explained above, in the present invention, mutual interference between the diagnostic frame and the normal frame does not exist. During the data transfer between the modules, except for the module to be diagnosed, the service module 1a can diagnose the module 2a to be diagnosed by using the diagnostic frame without affecting the above data transfer. Accordingly, when diagnosing the faults module, the module having the normal mode does not operate incorrectly based on the diagnostic frame by assuming that the service module 1a transferred the other module address erroneously.

When the service module 1a completes the diagnosis of the module to be diagnosed, the service module 1a transfers a diagnostic mode release command through the service bus 4, resets the diagnostic mode flip-flop 200, and releases the diagnostic mode. Since the service bus 4 has the object, as the detection/recovery means, to detect the abnormal operation of common bus 3 caused by a fault in a module, the data transfer volume is set as small as possible so that the failure rate is smaller than that of the common bus line 3.

Further, since the service module 1a can activate as external control signal of any module by means of the service bus 4, the following uses are possible, excluding the setting and release of the diagnostic module.

First, it is possible to forcedly disconnect the module from the common bus line 3 by using a fence signal FS. That is, the service module 1a generates a fence command and sends it to the module to be diagnosed through the service bus 4. The fence command is decoded by the command decoder 246b and the command decoder 246b generates the fence signal FS. The fence command FS is input to the driver/receiver DV/RV 25, 27a, 27b, and these are disconnected from the common bus 3 and the external interface by being set to a high impedance state. Accordingly, this method is utilized for disconnecting the faulty module from the common bus line 3 and preventing the error from spreading to the common bus line 3.

The fence signal FS can also be used for diagnosis. That is, for example, when the signal of a certain module is always turned ON on the common bus line 3 and this turning ON causes an operation fault in another module, the service module 1a sequentially connects or disconnects the bus to or from modules on the common bus line 3 to detect the fault.

Second, the forced stop and the reset and the start of the microprocessor are performed by the start/stop signal and the reset signal. That is, the module abnormally operates due to the error of the control program even if the hardware is normal. The service module 1a commands the stop, the reset and the start of the microprocessor 21 to stop, initialize and re-start when the module does not perform the predetermined response at he diagnostic mode. Accordingly, the service module 1a generates the stop command, the reset command and he start command through the service bus 4b, and decodes these signals in the command decoder 246b. This management of the modules for diagnosis can be performed through the service bus 4b without using the common bus line 3.

The structures of the service module 1a, the channel adapter module 2a, the cache module 2b and the disk adapter module 2c are shown in the above embodiment. Further, in addition to above, it may be possible to add a resource module and a memory module. Further, it may be possible to utilize another module as the management module instead of the service module.

I claim:

1. A diagnostic system in a data processing system constituted by a management module and a plurality of function modules, each having an address, a normal mode, and a diagnostic mode, and each being connected to said management module through a common bus line, said diagnostic system comprising:

service line means, operatively connected to the management module and said plurality of function modules, for issuing a diagnostic mode command;

diagnostic line means, operatively connected to said management module and said plurality of function modules, for providing a signal indicating a transfer of diagnostic data on the common bus line;

diagnostic mode storage means provided in each of the function modules, and operatively connected to said service line means for setting the diagnostic mode; and comparison means, provided in each of the function modules, and operatively connected to said diagnostic mode storage means and to said diagnostic line means, for comparing a content of said diagnostic mode storage means with the signal indicating the transfer of diagnostic data, by comparing an address on the common bus line with an address of a corresponding function module, a resultant data of the comparison being used as a condition for a module selection for the diagnosis so that a transfer of diagnostic data in said diagnostic mode is separated from the transfer of the data in said normal mode.

2. A diagnostic system as claimed in claim 1, wherein said diagnostic mode storage means comprises a flip-flop circuit.

3. A diagnostic system as claimed in claim 1, wherein said common bus line comprises: a control line for a bus description defining characteristics of the transfer data and the module address for transmission and reception; a data line for transferring the data; a response line for transferring/receiving response signals indicating a normal, a fault and a busy state; a bus request line for transferring a request of a bus occupation; and a bus grant line for transferring an acknowledge of a bus occupation.

4. A diagnostic system as claimed in claim 1, wherein said diagnostic line means is provided along with said common bus line.

5. A diagnostic system as claimed in claim 1, wherein said management module comprises a service adapter module.

6. A diagnostic system in a data processing system constituted by a management module and a plurality of function modules, each having an address, a normal mode, and each being, connected to said management module through a common bus line, said diagnostic system comprising:

a service bus line, operatively connected to the management module and said plurality of function modules, for issuing a diagnostic mode command;

diagnostic line, means, operatively connected to said management module and said plurality of function modules, for providing a signal indicating a transfer of diagnostic data on the common bus line;

diagnostic mode storage means provided in each of the function modules and operatively connected to said service bus line for setting the diagnostic mode; and comparison means provided in each of the function modules and operatively connected to said diagnostic mode storage means and to said diagnostic line means, for comparing a content of said diagnostic mode storage means with the signal indicating the transfer of diagnostic data, by comparing an address on the common bus line with an address of a corresponding function module, a resultant data of the comparison being used as a condition for a module selection in the diagnosis, and said management module manages said function module through said service bus line.

7. A diagnostic system as claimed in claim 6, wherein said service bus line comprises: a control line for a read/write, an interrupt and selection of each module, an address line for selecting said module and an internal address of said module, a data line for read/write for designated register, and a response line for response signals.

* * * * *

UNITED STATES PATENT AND TRADEMARK OFFICE
CERTIFICATE OF CORRECTION

PATENT NO.  : 5,005,172

DATED       : April 2, 1991

INVENTOR(S) : Masakazu Kawamoto

It is certified that error appears in the above-identified patent and that said Letters Patent is hereby corrected as shown below:

Col. 2, line 13, "module/ and" should be --module and--

Col. 6, line 27, "MLA" should be --MAR--.

Signed and Sealed this

Eighth Day of December, 1992

Attest:

DOUGLAS B. COMER

Attesting Officer

Acting Commissioner of Patents and Trademarks